US011492836B2

(12) United States Patent
Salter et al.

(10) Patent No.: US 11,492,836 B2
(45) Date of Patent: Nov. 8, 2022

(54) INTEGRATED PICK UP TRUCK BED (71) Applicant: Ford Global Technologies, LLC, Dearborn, MI (US)

(72) Inventors: Stuart C. Salter, White Lake, MI (US); David Brian Glickman, Southfield, MI (US); Paul Kenneth Dellock, Northville, MI (US); Aaron Halonen, Brighton, MI (US); Kristopher Karl Brown, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 629 days.

(21) Appl. No.: 16/517,984

(22) Filed: Jul. 22, 2019

(65) Prior Publication Data
US 2021/0025216 A1    Jan. 28, 2021

(51) Int. Cl.
*E05F 15/73* (2015.01)
*B62D 33/027* (2006.01)
*B62D 33/03* (2006.01)
*B60J 7/16* (2006.01)
*E05F 15/71* (2015.01)
*H02G 3/22* (2006.01)
*H01R 13/66* (2006.01)
*H01R 13/717* (2006.01)

(52) U.S. Cl.
CPC ............ *E05F 15/73* (2015.01); *B60J 7/1607* (2013.01); *B62D 33/0273* (2013.01); *B62D 33/03* (2013.01); *E05F 15/71* (2015.01); *H02G 3/22* (2013.01); *E05Y 2400/44* (2013.01); *E05Y 2400/45* (2013.01); *E05Y 2900/546* (2013.01); *H01R 13/6683* (2013.01); *H01R 13/717* (2013.01); *H01R 2201/26* (2013.01)

(58) Field of Classification Search
CPC ......... E05F 15/73; E05F 15/71; B60J 7/1607; B62D 33/0273; B62D 33/03; H02G 3/22; E05Y 2400/44; E05Y 2400/45; E05Y 2900/546; E05Y 2400/852; E05Y 2900/544; H01R 13/6683; H01R 13/717; H01R 2201/26; B60R 16/02; B60R 16/0215
USPC ........................................................... 701/49
See application file for complete search history.

(56) References Cited

U.S. PATENT DOCUMENTS

| | | | |
|---|---|---|---|
| 5,806,906 A * | 9/1998 | Hammond | B60J 1/2011 296/165 |
| 6,053,556 A * | 4/2000 | Webb | B60J 7/085 296/100.15 |
| 7,052,071 B2 * | 5/2006 | Mulder | E05B 83/26 296/100.1 |
| 8,087,713 B2 * | 1/2012 | Schrader | B60J 7/20 296/100.18 |

(Continued)

*Primary Examiner* — Muhammad Shafi
(74) *Attorney, Agent, or Firm* — Vichi Chea; Carlson, Gaskey & Olds, P.C.

(57) ABSTRACT

A vehicle cargo compartment system includes an electric outlet mounted within an accessible location within a vehicle cargo compartment and a sensor assembly mounted proximate the electric outlet within the cargo compartment for detecting a presence of an electrical power cord. The cargo compartment system integrates powered features such as an electric outlet, powered tailgate and the powered top that utilizes environmental information gathered by various sensors on the vehicle in combination with predefined actions to simplify use and automate operation.

15 Claims, 7 Drawing Sheets

(56) References Cited

U.S. PATENT DOCUMENTS

| | | | | |
|---|---|---|---|---|
| 9,150,259 B2* | 10/2015 | Jutila | ............... | B60J 7/085 |
| 9,211,834 B2* | 12/2015 | Facchinello | ............. | B60P 7/02 |
| 9,248,871 B1* | 2/2016 | Waskie | ............... | E05C 17/36 |
| 9,956,996 B2* | 5/2018 | Astrike | ............... | B60R 5/042 |
| 10,173,506 B2* | 1/2019 | Nania | ............... | B60P 7/04 |
| 2010/0140973 A1* | 6/2010 | Duncan | ............... | B60J 7/141 |
| | | | | 296/100.09 |
| 2017/0210214 A1* | 7/2017 | Weltikol | ............... | B60P 7/02 |
| 2018/0043759 A1* | 2/2018 | Rohr | ............... | B60J 7/1607 |
| 2020/0062185 A1* | 2/2020 | Scaringe | ............... | B60J 5/0491 |

* cited by examiner

INTEGRATED PICK UP TRUCK BED

TECHNICAL FIELD

This disclosure relates to a system for a cargo bed including a liftgate tonneau cover and electric outlet.

BACKGROUND

Vehicles with a rear cargo area can include a rear lift gate and a cover. The cargo area may also include an accessible power outlet. Operation of the rear lift gate and cover may be powered.

SUMMARY

A vehicle cargo compartment system according to an exemplary aspect of the present disclosure includes, among other things, an electric outlet mounted within an accessible location within a vehicle cargo compartment, a sensor assembly mounted proximate the electric outlet within the cargo compartment for detecting a presence of an electrical power cord.

In a further non-limiting embodiment of the foregoing vehicle cargo compartment system, a controller is in communication with the sensor assembly and programed to generate an action in response to detecting a presence of an electrical power cord interfaced with the electric outlet.

In a further non-limiting embodiment of any of the foregoing vehicle cargo compartment systems, the sensor assembly comprises an infrared sensor assembly that detects a presence of the electric conduit within an area proximate the electric outlet.

In a further non-limiting embodiment of any of the foregoing vehicle cargo compartment systems, the controller is programed to generate a signal to alert an operator of a presence of an electrical conduit interfaced with the electric outlet responsive to an attempt to operate the vehicle.

In a further non-limiting embodiment of any of the foregoing vehicle cargo compartment systems, a proximity sensor detects objects proximate to a powered tailgate of the vehicle and the controller is programmed to automatically lower the powered tailgate responsive to the proximity sensor communicating information to the controller indicating that no obstruction to lowering the powered tailgate is present and operation of the electric outlet has been initiated.

A further non-limiting embodiment of any of the foregoing vehicle cargo compartment systems includes a powered tonneau top and the controller is programed to automatically open the powered tonneau top to a position enabling access to the electric outlet responsive to turning the electric outlet on.

In a further non-limiting embodiment of any of the foregoing vehicle cargo compartment systems, the controller is programmed to automatically close one or both the powered tailgate and the powered tonneau top in response to the proximity sensor communicating information to the controller indicating that a human user is no longer within an area proximate the cargo compartment.

In a further non-limiting embodiment of any of the foregoing vehicle cargo compartment systems, the controller is programmed to automatically close one or both the powered tailgate and the powered tonneau top in response to receiving information indicative of predefined weather event and that a human is not proximate the cargo compartment.

In a further non-limiting embodiment of any of the foregoing vehicle cargo compartment systems, the powered tailgate includes a cord router along a top rail, the cord router providing a pass-through opening for an electric conduit such that the powered tailgate may be moved to a closed position with an electric conduit interfaced with the electric outlet and extends out of the cargo compartment.

In a further non-limiting embodiment of any of the foregoing vehicle cargo compartment systems, the cord router is moveable between a closed position where the pass-through opening is blocked and an open position where the pass-through opening is unobstructed.

A further non-limiting embodiment of any of the foregoing vehicle cargo compartment systems, includes a light assembly automatically operable to illuminate the cargo compartment proximate the electric outlet in response to the electric outlet being turned on.

A further non-limiting embodiment of any of the foregoing vehicle cargo compartment systems, includes a cargo bed liner with a retention feature for holding the electric conduit in a position below a top surface of the bed liner.

A vehicle cargo compartment according to another exemplary aspect of the present disclosure includes, among other things, a powered panel automatically movable to a position between an open position and a closed position and a routing assembly defining a path for a power cord to extend out of the cargo compartment with the powered panel in the closed position.

In a further non-limiting embodiment of the foregoing vehicle cargo compartment, the powered panel comprises a powered tailgate with a top rail portion and the routing assembly comprises a movable portion of the top rail that is movable between a closed position where a pass-through opening is blocked and an open position where the pass-through opening is unobstructed.

In a further non-limiting embodiment of any of the foregoing vehicle cargo compartments, the top rail portion comprises a body defining the pass-through opening and a spring biasing the body portion downward, wherein the body portion is movable upward from a closed position and rotated to expose the pass-through opening and returned to a position corresponding with the top rail portion by the spring.

In a further non-limiting embodiment of any of the foregoing vehicle cargo compartments, the powered panel comprises a power tonneau with a seal disposed at an end for forming an interface with a tailgate, the seal is partially conformable to accommodate an electric conduit extending through the interface.

A method of operating a vehicle cargo compartment system according to another exemplary aspect of the present disclosure includes, among other things sensing with a sensor assembly a presence or absence of an electrical conduit interface with an electric outlet mounted within an accessible location within a vehicle cargo compartment and generating an automatic response by a controller in communication with the sensor assembly in response to detecting the presence of an electrical conduit interfaced with the electric outlet.

In a further non-limiting embodiment of the foregoing method, the controller generates an alert signal to alert an operator of a presence of an electrical conduit interfaced with the electric outlet responsive to an attempt to operate the vehicle.

In a further non-limiting embodiment of any of the foregoing methods, a proximity sensor detects objects proximate to a powered tailgate of the vehicle and the controller automatically lowers the powered tailgate responsive to the proximity sensor communicating information to the controller indicating that no obstruction to lowering the powered tailgate is present and operation of the electric outlet has been initiated.

A further non-limiting embodiment of any of the foregoing methods, includes automatically opening a powered tonneau top to a position enabling access to the electric outlet responsive to turning the electric outlet on.

A further non-limiting embodiment of any of the foregoing methods, includes automatically closing one or both a powered tailgate and the powered tonneau top in response to the proximity sensor communicating information to the controller indicating that a human user is no longer within an area proximate the cargo compartment.

A further non-limiting embodiment of any of the foregoing methods, includes automatically closing one or both of the powered tailgate and the powered tonneau top in response to receiving information indicative of predefined weather event and that a human is not proximate the cargo compartment.

A further non-limiting embodiment of any of the foregoing methods, includes automatically operating a light assembly to illuminate the cargo compartment proximate the electric outlet in response to the electric outlet being turned on and a low light condition is detected.

The various features and advantages of this disclosure will become apparent to those skilled in the art from the following detailed description. The drawings that accompany the detailed description can be briefly described as follows.

DETAILED DESCRIPTION

Figure 1:
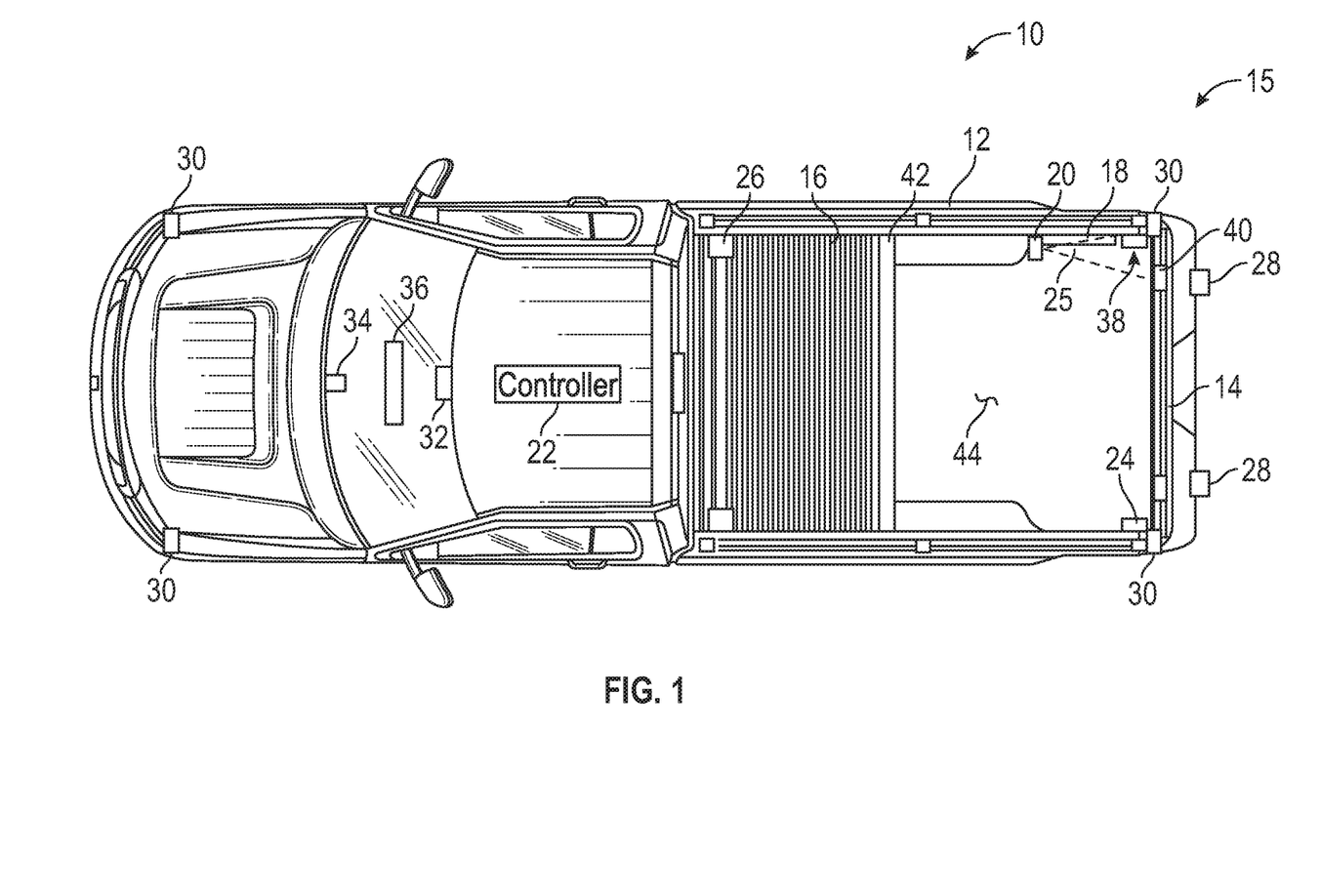
FIG. 1 is a schematic view of a vehicle including an example cargo compartment system embodiment.
Figure 2:
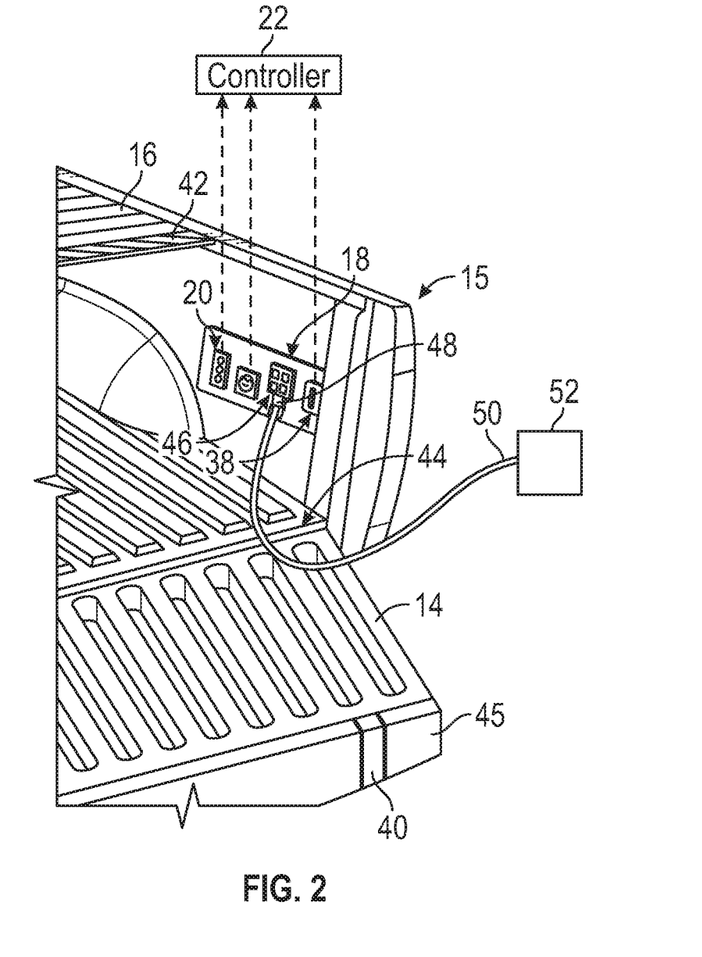
FIG. 2 is a perspective view of a portion of the example cargo compartment system embodiment.

Referring to FIGS. 1 and 2 an example vehicle 10 includes cargo compartment 12 with an externally accessible power panel 18. The cargo compartment 12 includes bed floor 44, a powered tailgate 14 and a powered tonneau top 16. The power tailgate 14 includes an actuator 24 for moving the tailgate 14 between an open position (FIG. 2) and a closed position (FIG. 1). The power tonneau top 16 includes an actuator 26 for moving the tonneau top 16 between an open and a closed position. The powered features of the example cargo compartment 12 operate as integrated system 15 to automate operations based on sensed conditions according to predefined scenarios.

The example disclosed power tonneau top 16 rolls outward along the top of the cargo compartment 12. It should be understood that other power top actuation methods and configurations are within the contemplation and scope of this disclosure. For example, the power top 16 may be a single solid panel that lifts upward about a pivot point. Similarly, the tailgate 14 may be actuated according to a different actuator mechanism and configuration.

A sensor assembly 20 is mounted proximate the power panel 18 for detecting a presence and/or absence of an electrical power cord 50 interfaced with the power panel 18. The disclosed electric power cord 50 includes a plug 48 that is plugged into an outlet 46 of the power panel 18 to power an accessory item 52. The accessory item 52 may operate on alternating current (AC) or direct current (DC) as selected by an operator. A light 38 is provided on or near the power panel 18 for illuminating the panel 18 in low light conditions. A controller 22 is in communication with the sensor assembly 20 and uses information gathered by the sensor assembly 20 to coordinate operation of the power tailgate 14 and power tonneau cover 16. The cargo compartment 12 is operated as an automated system 15 that operates according to sensed inputs to provide a predefined series of automated actions.

The vehicle 10 includes other sensors for detecting a presence objects or people around the vehicle. In this example, proximity sensors 28 are disposed at an aft end of the vehicle 10. In this disclosed embodiment, the proximity sensors 28 are ultrasonic sensors that detect both objects and people proximate the rear of the vehicle. The sensors 28 are in communication with the controller 22 and provide information indicative of objects proximate the vehicle 10.

The vehicle further includes a day/night sensor 34 and a rain sensor 32. The sensors 34 and 32 communicate with the controller 22 to provide information utilized for operation of the cargo compartment system 15. The vehicle further includes a control panel 36 within the vehicle cabin. The example control panel 36 is a touch screen display that enables an operator to control operation of the power panel 18 and set preferences for automatic operation. It should be appreciated that although a touch screen panel is disclosed, other input devices within the vehicle cabin or as part of a mobile device are within the contemplation and scope of this disclosure.

The vehicle 10 further includes Bluetooth low energy (BLE) antennas 30 disposed at different locations of the vehicle 10. The BLE antennas 30 provide a means of detecting and determining the location of an operator holding a keyfob or other mobile device in communication with the vehicle 10 by way of the BLE antennas 30. The location of an operator around the vehicle and/or the absence of an operator is communicated to the controller 22 and used to implement automatic operation in response to certain conditions.

The controller 22 may be a dedicated controller for the cargo compartment system 15 or part of a vehicle controller. Moreover, the controller 22 will include a combination of hardware and programming that to communicate and control the powered features of the cargo compartment system 15.

In one disclosed embodiment, the sensor 20 continually monitors the area within the scan area 25 in front of the power panel 18. The sensor 20 detects the presence of the electrical cord 50 and plug 48 interfaces with the power panel 18. Actions by the cargo system 15 are coordinated based on information indicating that the cord 50 is present. In one example, the controller 22 will generate an alert to an operator in response to the vehicle 10 being placed in a drive gear and the sensor 20 indicating that the electrical cord 50 is present. The alert may be in the form of flashing lights of the vehicle, a message on the control panel 36 and/or a message to a mobile device linked to the vehicle. In contrast, the sensor 20 provides information indicating that no cord 50 is present to provide assurance that a cord 50 is not still connected.

Figure 3:
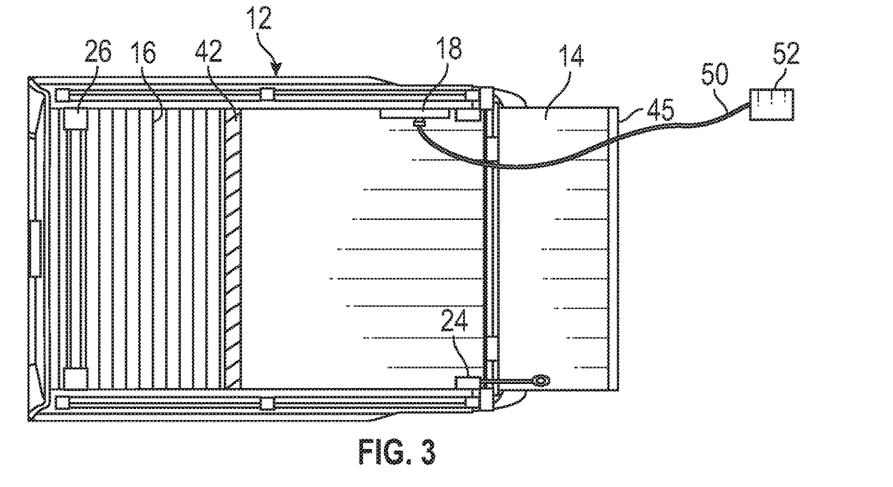
FIG. 3 is schematic view of the example cargo compartment system in an open position.

Referring to FIG. 3 with continued reference to FIGS. 1 and 2, in another disclosed embodiment, with a cord 50 plugged into the power panel 18, the controller 22 alerts an operator if the power tailgate 14 or the power tonneau top 16 is actuated. As appreciated, closing of the tailgate 14 and/or the tonneau top 16 may interfere with the cord 50. The sensor 20 on the power panel 18 therefore alerts an operator and prevents closing of either or both the tonneau top 16 and tailgate 14 if the cord 50 would interfere with movement from a current position to another position.

In another disclosed embodiment, once an operator turns the power panel 18 on, both the tailgate 14 and top 16 can open to automatically provide access to the panel without the operator having to individual operate each device. Moreover, the controller 22 receives information from the proximity sensors 28 to ascertain if an object is present that may interfere with opening of the tailgate 14. If an object is detected, the controller 22 will alert the operator, either through the control panel 36, signal to a linked mobile device or by flashing the vehicle lights or some combination of all possible actions. If no objects are detected, the tailgate 14 and top 16 can be opened to a predefined position to enable access. The top 16 may be retracted only a predefined distance determined to provide sufficient room and access.

In another disclosed embodiment, when on operator moves away from the vehicle 10 a predefined distance, the vehicle 10 can automatically close the tailgate 14 and the top 16 to protect and secure the contents of the cargo compartment 12. The controller 22 utilizes various information from the sensors disposed on the vehicle to determine that an operator is either present or absent from the vehicle. If the operator is absent from the vehicle for a predefined time, the controller 22 can actuate both the tailgate 14 and the top 16 to move to a closed position to secure and protect items with the cargo compartment 12.

Similarly, if the rain detector 32 sense rain, the controller 22 can execute a predefined automatic actions to shield the cargo compartment 12. It should be appreciated that although different operation scenarios are disclose by way of example, many other predefined actions in response to detection of certain environmental conditions could be implemented and are within the contemplation and scope of this disclosure.

In another disclosed embodiment, the system 15 can be operated to close both the tailgate 14 and the top 16 once the power panel 18 is turned off. In such an operation, the sensor 20 would scan the area around the power panel 18 to assure that no cord remains attached. If no cord 50 is detected, the controller 15 can operate the system 15 to automatically close both the tailgate 14 and the top 16. However, if a cord 50 is detected, the system 15 can alert the operator and delay closing of the tailgate 14 and top 16. The vehicle 10 may also be programmed to disable engagement of a drive gear until all cords 50 are cleared from the power panel 18.

In another disclosed embodiment, upon the detection of an operator near the rear of the vehicle 10, the power tailgate 14 is automatically opened to enable access to the cargo compartment 12 and the power panel. The system 15 may wait a predefined time to confirm that the operator would like access to the cargo compartment and provide such access in response to detected positon of the operator and the elapse of time.

In another disclosed example embodiment, the controller 22 receives information from the day/night sensor 34 and actuates the light 38 in response to low light conditions. Actuation of the light 38 may accompany any action that is initiated to enable and/or prepare for use of the power panel 18.

Figure 4:
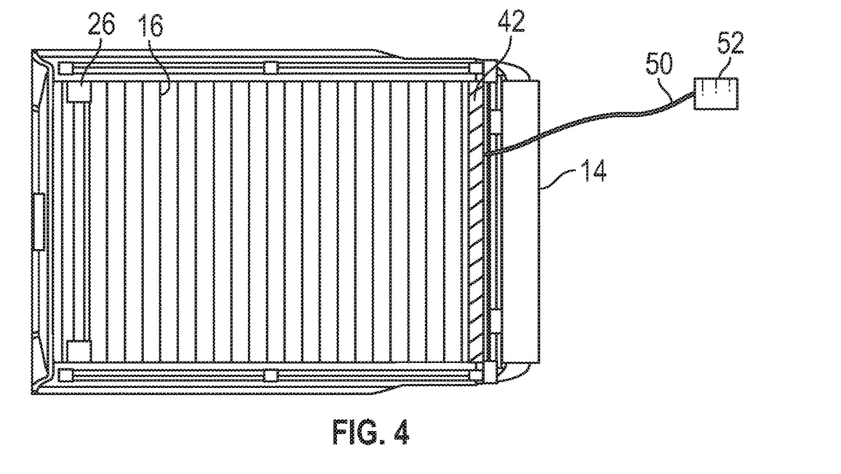
FIG. 4 is a schematic view of the example cargo compartment system in a closed position.

Referring to FIG. 4, with continued reference to FIGS. 1 and 2, when an automatic closing operation is called for based on the sensed conditions, the cord 50 may still be engaged to the power panel 18. Accordingly, the cord 50 extends out of the vehicle 10 and may inhibit closing and securement of the compartment. The disclosed example embodiment shown in FIG. 7 includes a cord management feature that enables routing of the power cord 50 out of the cargo compartment 12 while enabling closing of both the power tailgate 14 and the top 16. In this embodiment, the top 16 includes a seal 42. The seal 42 is conformable around obstructions such as the power cord 50 but will still engage the tailgate 14 to provide both security and protection from the elements.

Figure 5:
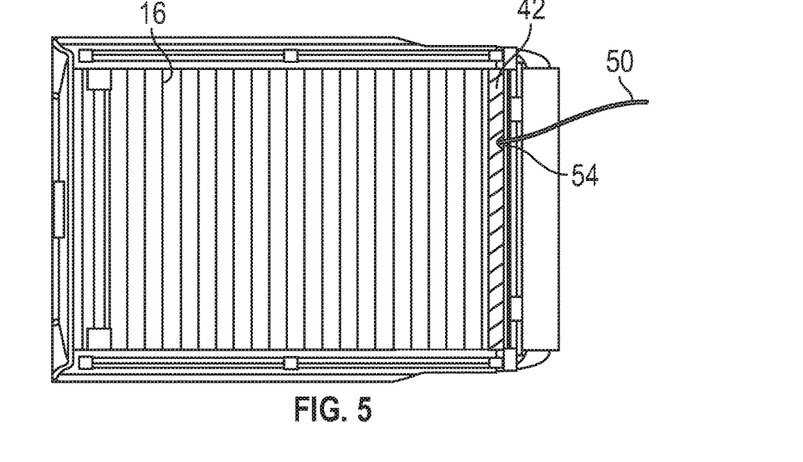
FIG. 5 is a schematic view of the example cargo compartment with an cord routed through a seal of a power tonneau top.

Referring to FIG. 5 with continued reference to FIG. 4, the seal 42 is conformable around the cord 50. The conforming area around the cord 50 provides an opening 54 to accommodate the cord 50 when in a closed position.

Figure 6:
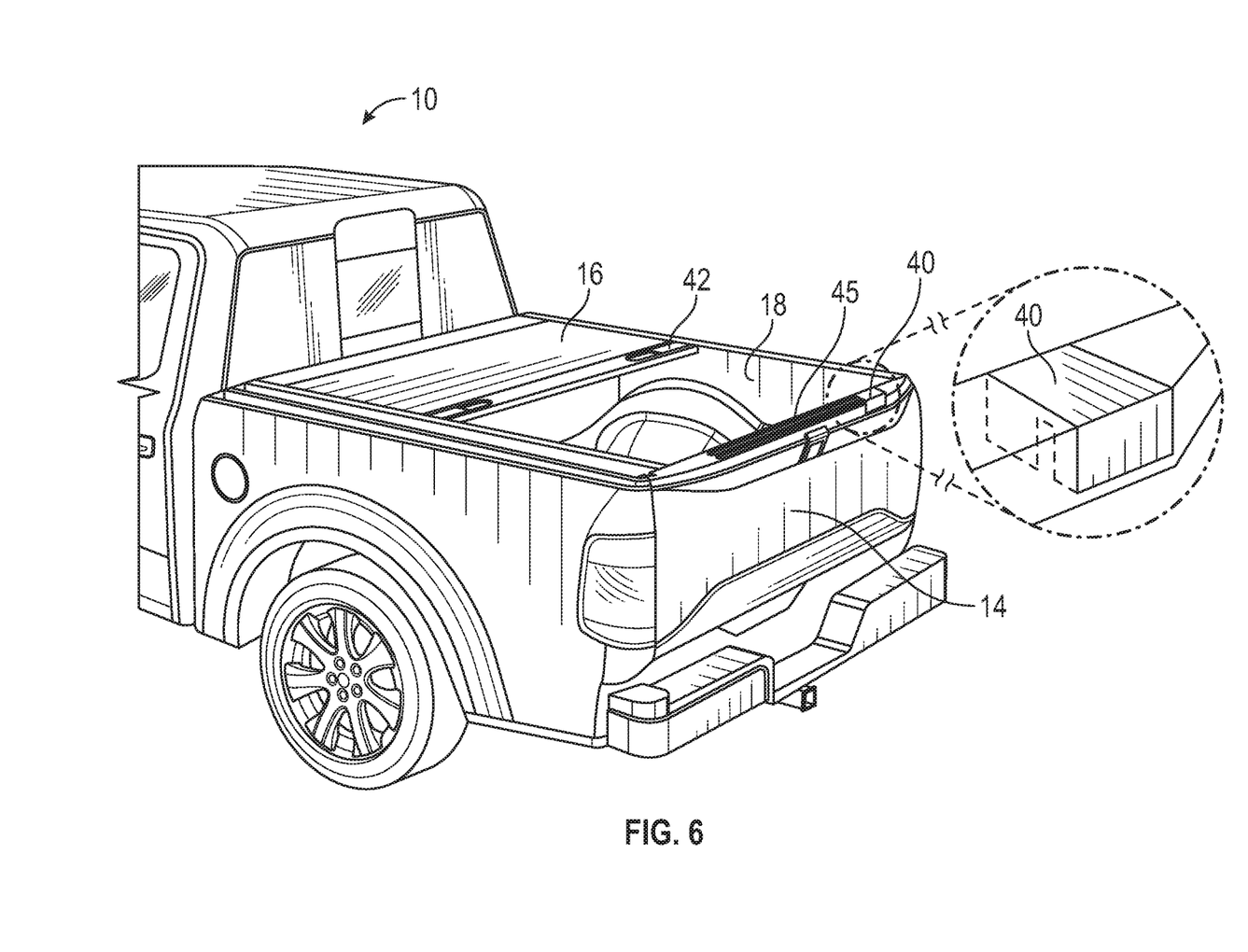
FIG. 6 is a schematic view of a tailgate including top rail with an example cord router embodiment.
Figure 7:
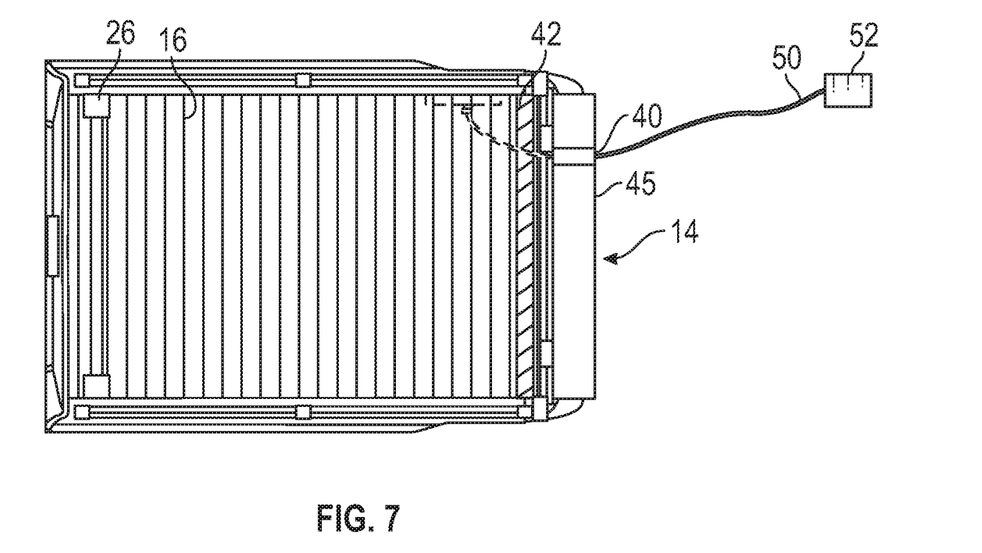
FIG. 7 is a schematic view of the example cargo compartment in a closed position with a power cord routed through the example cord router.
Figure 8:
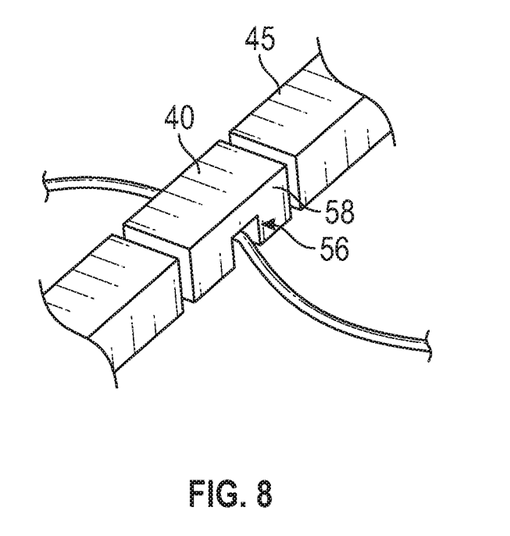
FIG. 8 is a schematic view of a cord routed through the example cord router.

Referring to FIGS. 6, 7 and 8, the tailgate 14 may also include a cord management feature. In this disclosed example, the tailgate 14 includes a top rail 45 with a cord router 40 that conforms to the top rail 45. The cord router 40 is moveable between a closed position shown in FIG. 6 and an open position shown in FIG. 8. In the open position, the cord 50 can be routed through a pass through opening 56. With the cord 50 disposed within the opening 56, the tailgate 14 may be moved between the open and closed positions with the cord 50 plugged into the power panel 18.

Figure 9:
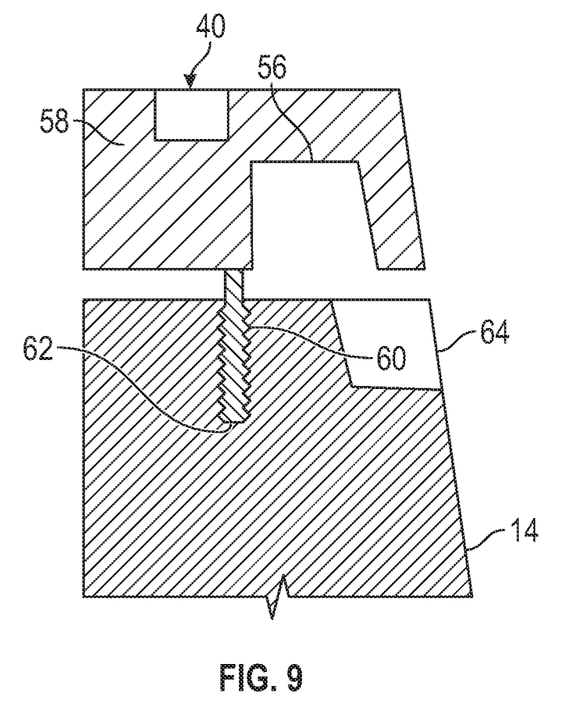
FIG. 9 is a cross-section of an example cord router embodiment.

Referring to FIG. 9, the example cord router 40 includes a body portion 58 that defines the opening 56. The opening 56 passes through the body portion 58 along an entire width and along bottom surface to enable insertion of the cord 50. A post 62 extends from the body portion 58 and into the tailgate 14. A spring 60 is engaged to the post to bias the cord router 40 into a position substantially flush with the top rail 45.

Figure 10A:
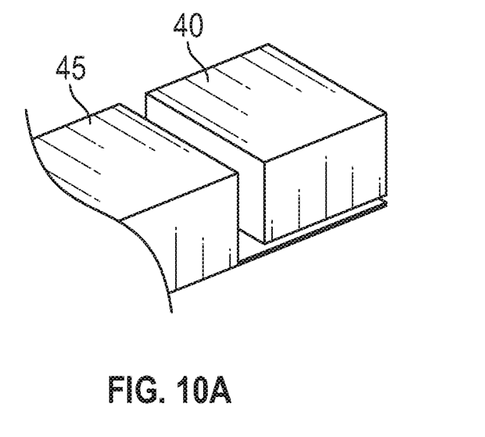
FIG. 10A is a schematic view of the example cord router embodiment in a closed position.
Figure 10B:
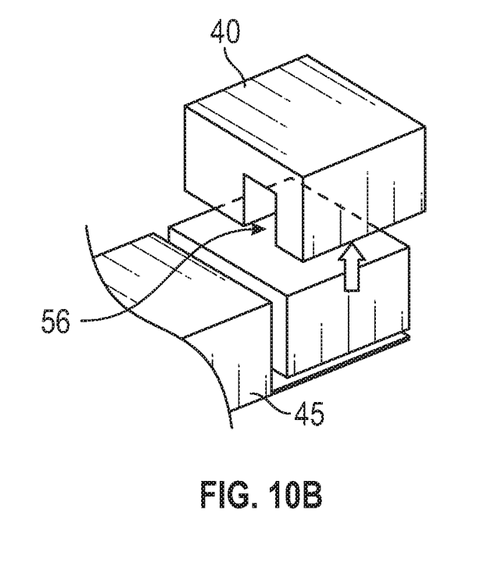
FIG. 10B is a schematic view of the example cord router embodiment in a first intermediate position between the closed position and an open position.
Figure 10C:
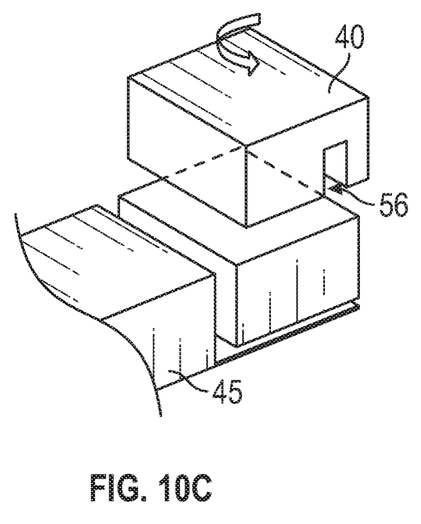
FIG. 10C is a schematic view of the example cord router embodiment in a second intermediate position between the closed position and the open position.
Figure 10D:
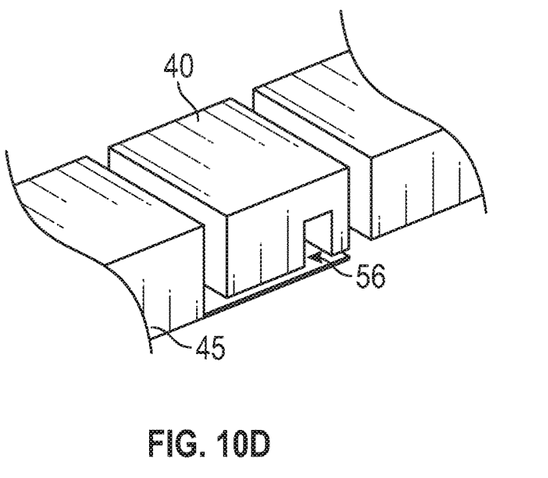
FIG. 10D is a schematic view of the example cord router in the open position.

Referring to FIGS. 10A-10D with continued reference to FIG. 9, to utilize the cord router 40 it is moved from a closed position as show in FIG. 10A to an open positon shown in FIG. 10D. Movement to the open position is accomplished by first lifting the body portion 58 upward against the biasing force of the spring 60 as shown in FIG. 10B. Once the body portion 58 is raised sufficiently to clear the surrounding parts of the top rail 45, it is twisted to place the opening 56 transverse relative to a width of the tailgate 14 and expose the opening 56. The cord 50 would be inserted through the opening while held in the upward intermediate positon shown in FIG. 10C. Once the cord 50 is provided in the opening 56, the cored router 40 can be released and will move downwardly back to a position flush with the top rail 45. The cord 50 may then be freely moved through the opening with the tailgate 14 in either the open or closed position. Moreover, the cord router 40 will hold the cord 50 in place during use and extension outside the cargo compartment 12.

Figure 11:
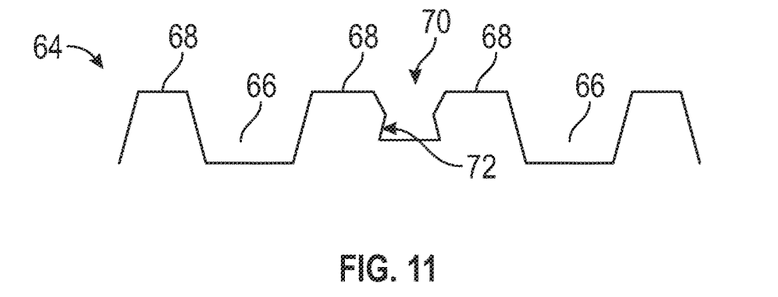
FIG. 11 is a schematic view of a portion of an example bed liner.
Figure 12:
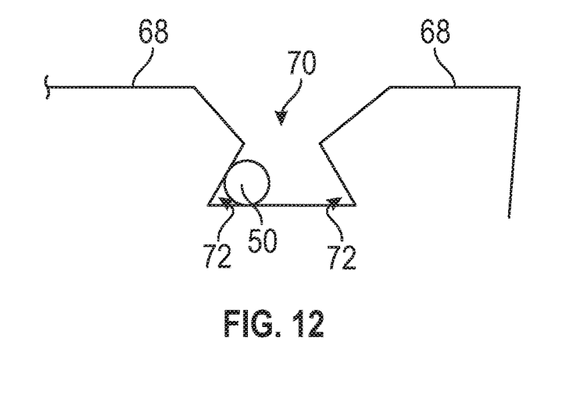
FIG. 12 is an enlarged schematic view of the example bed liner and cord retention feature.

Referring to FIGS. 11 and 12, another cord management feature is provide in the bed of the cargo compartment to hold the cord 50 in place and protect the cord from being stepped on. An illustrated example cross-section of a portion of a bed liner 64 includes flat peaks 68. The peaks 68 define the support surface within the cargo compartment 12. Between the flat peeks are valleys 66. A retention structure 70 is provided instead of the valleys 66 in at least one location along the bed liner 64. The retention structure includes an indentation 72 within which the cord 50 can be held. The indentation 72 is sized to provide a light interference fit with the cord 50 to hold the cord 50 in place while enabling removal when desired. The retention structure 70 enables the cord to be held in place while in use and while the tailgate 14 is moved between open a closed positions. As appreciated, although one retention structure 70 is shown by way of example, any number of retention structures could be utilized are within the contemplation of this disclosure.

Accordingly, the disclosed cargo compartment 12 integrates powered features such as the power panel 18, the powered tailgate 14 and the powered tonneau top 16 into a system 15 that utilizes environmental information gathered by various sensors on the vehicle in combination with predefined actions to simplify use and automate operation. Moreover, the disclosed cargo compartment 12 integrates cord management features that aid and enable the automated actions of the various powered features.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle cargo compartment system comprising:
   an electric outlet mounted within an accessible location within a vehicle cargo compartment;
   a powered tailgate including an actuator for moving the powered tailgate between an open and a closed position;
   a sensor assembly mounted proximate the electric outlet within the cargo compartment for detecting a presence of an electrical cord interfaced with the electric outlet; and
   a controller in communication with the sensor assembly and the actuator of the powered tailgate, wherein the controller is programmed to automatically control the actuator to move the powered tailgate based on information communicated from the sensor assembly.

2. The vehicle cargo compartment system as recited in claim 1, wherein the sensor assembly comprises an infrared sensor assembly that detects a presence of the electric conduit within an area proximate the electric outlet.

3. The vehicle cargo compartment system as recited in claim 1, wherein the controller is programed to generate a signal to alert an operator of a presence of an electrical conduit interfaced with the electric outlet responsive to an attempt to operate the vehicle.

4. The vehicle cargo compartment system as recited in claim 1, including a proximity sensor detecting objects proximate to the powered tailgate of the vehicle and the controller is programmed to automatically lower the powered tailgate responsive to the proximity sensor communicating information to the controller indicating that no obstruction to lowering the powered tailgate is present and operation of the electric outlet has been initiated.

5. The vehicle cargo compartment as recited in claim 1, including a light assembly automatically operable to illuminate the cargo compartment proximate the electric outlet in response to the electric outlet being turned on.

6. The vehicle cargo compartment as recited in claim 1, including a cargo bed liner with a retention feature for holding the electric conduit in a position below a top surface of the vehicle cargo compartment.

7. The vehicle cargo compartment system as recited in claim 1, wherein the electric outlet is part of a power panel disposed within the cargo compartment and the sensor assembly is part of the power panel.

8. The vehicle cargo compartment system as recited in claim 7, wherein the power panel includes a lighting device.

9. The vehicle cargo compartment system as recited in claim 1, including a proximity sensor mounted proximate to the cargo compartment for detecting objects proximate the cargo compartment.

10. The vehicle cargo compartment system as recited in claim 9, wherein the controller is programmed to automatically move the powered tailgate to the open position when the electric outlet is turned on and the proximity sensor does not detect an object proximate the powered tailgate.

11. A method of operating vehicle cargo compartment system comprising:
    sensing with a sensor assembly a presence or absence of an electrical conduit interface with an electric outlet mounted within an accessible location within a vehicle cargo compartment;
    automatically generating an alert signal with a controller in communication with the sensor assembly in response to the sensor assembly detecting the presence of an electrical conduit interfaced with the electric outlet; and
    automatically actuating a powered tailgate actuator to move a power tailgate associated with the vehicle cargo compartment to one of an open position or a closed position in response to the detected presence of the electrical conduit by the sensor assembly.

12. The method as recited in claim 11, wherein the controller generates the alert signal to alert an operator of a presence of an electrical conduit interfaced with the electric outlet responsive to an attempt to operate the vehicle.

13. The method as recited in claim 11, including a proximity sensor detecting objects proximate to the powered tailgate of the vehicle and the controller automatically moves the powered tailgate to the open position responsive to the proximity sensor communicating information to the controller indicating that no obstruction to lowering the powered tailgate is present and operation of the electric outlet has been initiated.

14. The method as recited in claim 11, further comprising automatically opening the power tailgate in response to the electric outlet being turned on.

15. The method as recited in claim 14, further comprising automatically closing the power tailgate in response to a signal from the sensor assembly indicating that a vehicle operator has moved away from the vehicle cargo compartment.

* * * * *